April 9, 1940.  G. WALTERS  2,196,570
CLUTCH FRICTION DISK
Original Filed June 10, 1937   3 Sheets-Sheet 1
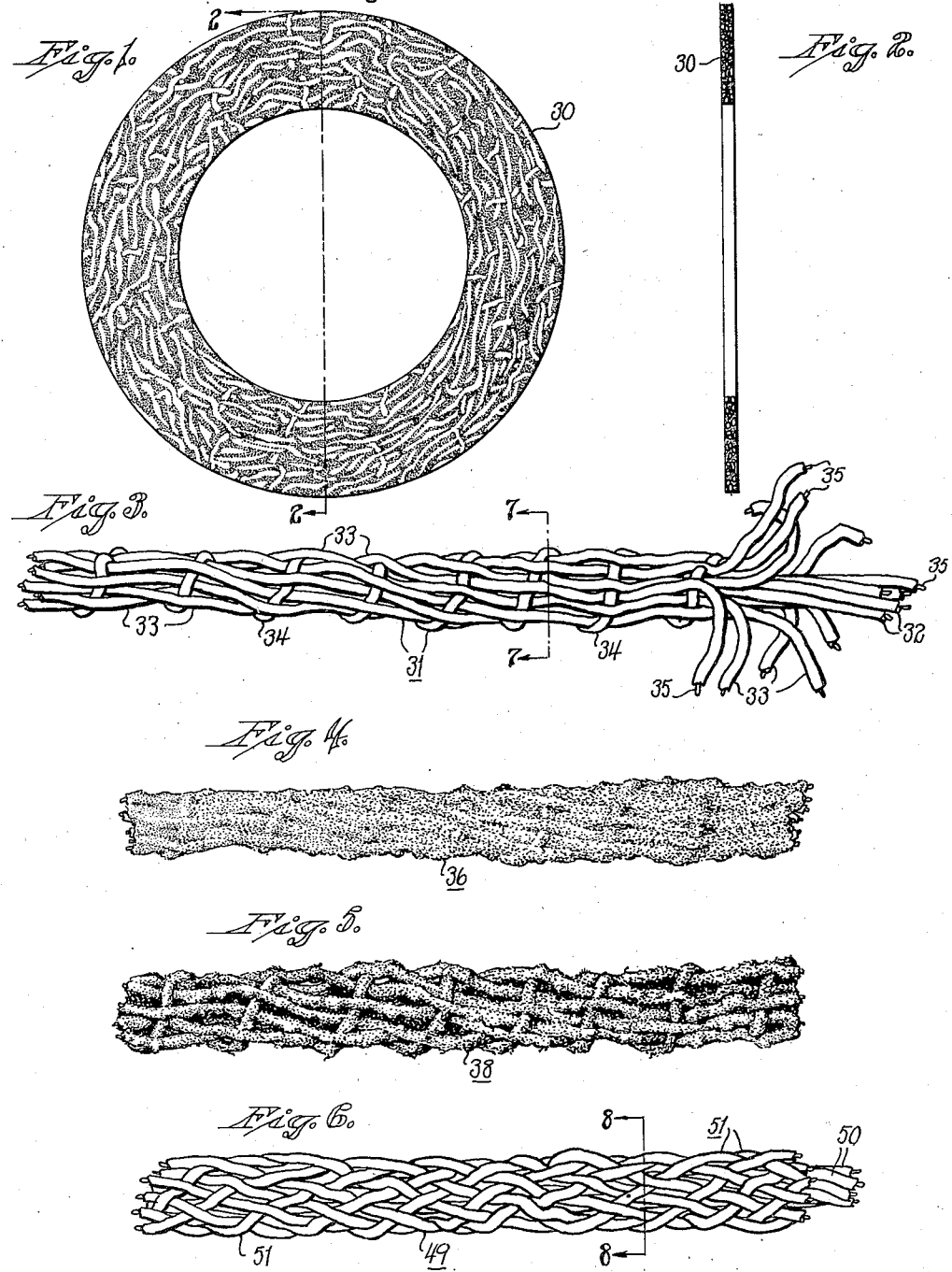
Inventor
Gustav Walters
By Seymour Earle Nichols
Attorneys April 9, 1940.  G. WALTERS  2,196,570
CLUTCH FRICTION DISK
Original Filed June 10, 1937   3 Sheets-Sheet 2
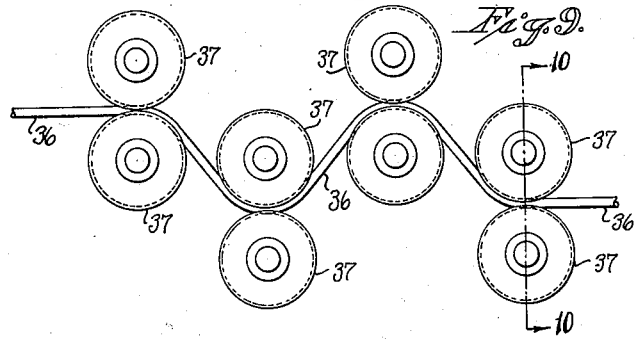
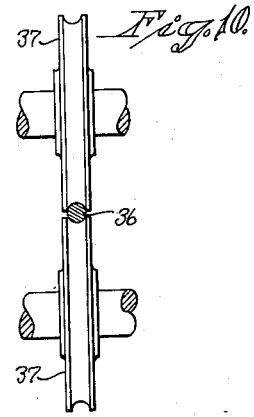
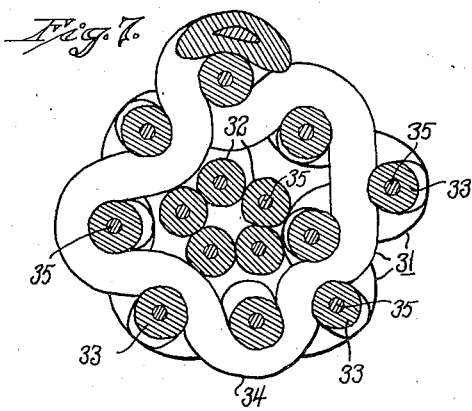
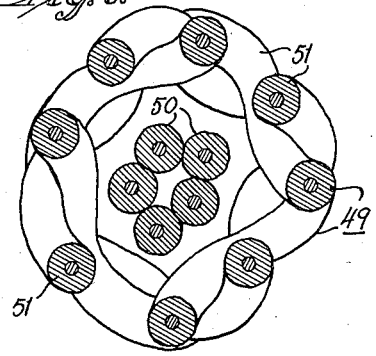
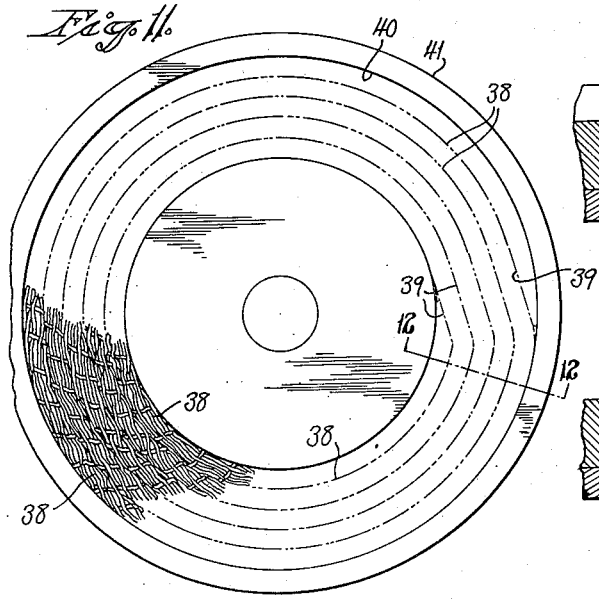
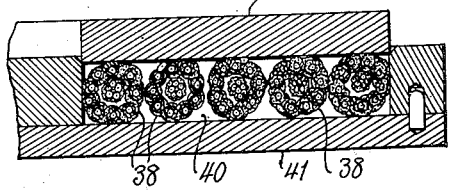
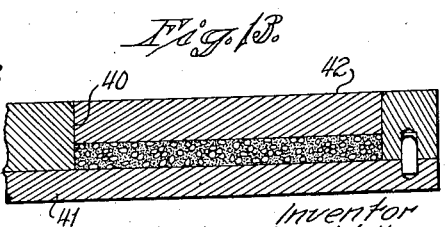
Inventor
Gustav Walters
By Seymour Earle & Nichols
Attorneys April 9, 1940.  G. WALTERS  2,196,570
CLUTCH FRICTION DISK
Original Filed June 10, 1937   3 Sheets-Sheet 3
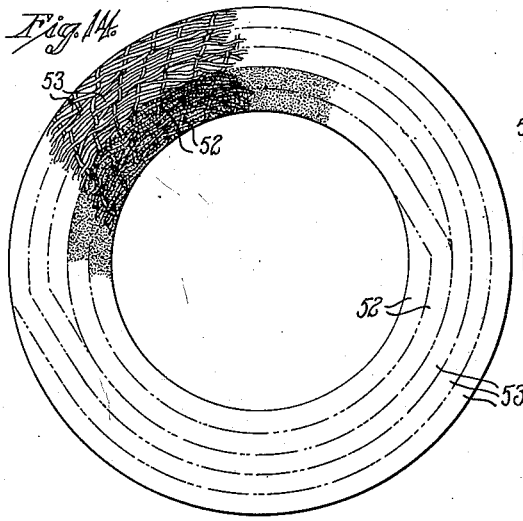
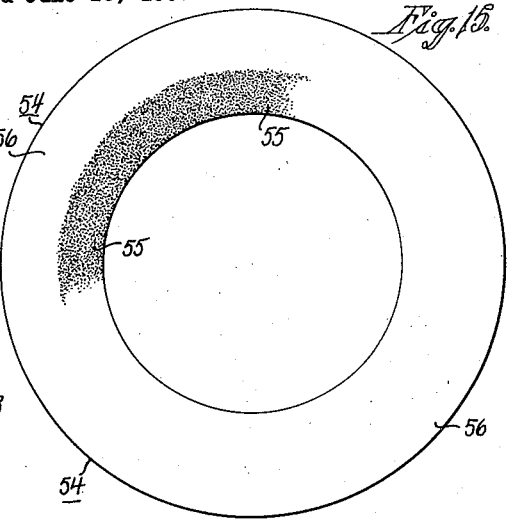
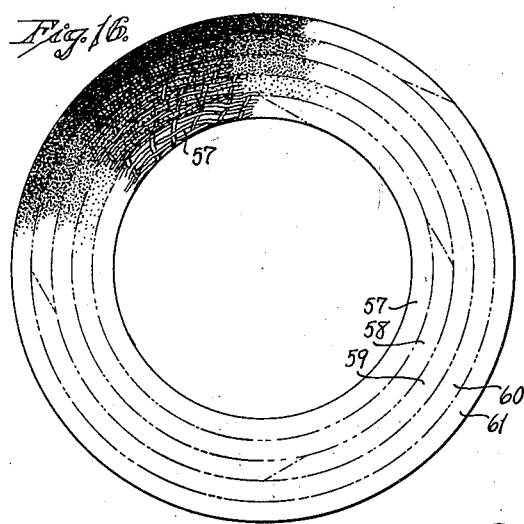
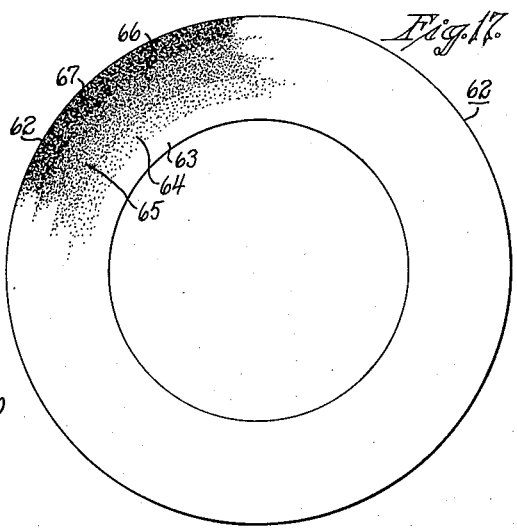
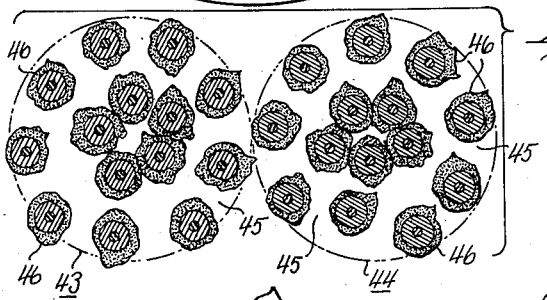
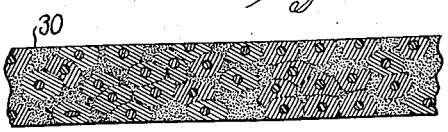
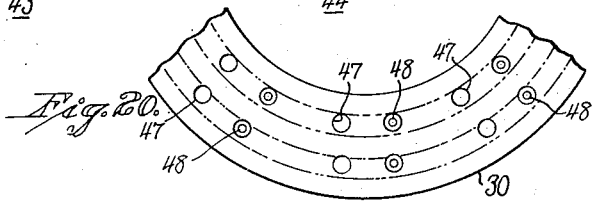
Inventor
Gustav Walters
By
Seymour Earle & Nichols
Attorneys Patented Apr. 9, 1940

2,196,570

UNITED STATES PATENT OFFICE 2,196,570

CLUTCH FRICTION DISK

Gustav Walters, Middletown, Conn., assignor to The Russell Manufacturing Company, Middletown, Conn., a corporation of Connecticut Application June 10, 1937, Serial No. 147,446
Renewed November 4, 1939

11 Claims. (Cl. 192—107)

This invention relates to improvements in clutch friction disks.

One object of this invention is to provide an improved clutch friction disk characterized by smooth-action non-chatter qualities substantially throughout the life of the disk.

Another object of this invention is to provide an improved clutch friction disk having maximum resistance to bursting by centrifugal force.

With the above and other objects in view, as will appear to those skilled in the art from the present disclosure, this invention includes all features in the said disclosure which are novel over the prior art.

In the accompanying drawings, in which certain ways of carrying out the invention are shown for illustrative purposes:

Fig. 1 is a face view of a clutch friction disk made in accordance with this invention;

Fig. 2 is a sectional view on line 2—2 of Fig. 1;

Fig. 3 is a side view of a portion of a woven form of rope-like web used for making a clutch friction disk in accordance with this invention;

Fig. 4 is a view similar to Fig. 3, after the web has been subjected to impregnation with friction treatment;

Fig. 5 is a view similar to Fig. 4, after the treated web of Fig. 4 has been subjected to a breaking-up operation;

Fig. 6 is a modified construction shown in side view, of a braided form of rope-like web used for making a clutch friction disk in accordance with this invention;

Fig. 7 is a sectional view on line 7—7 of Fig. 3;

Fig. 8 is a sectional view on line 8—8 of Fig. 6;

Fig. 9 is a diagrammatic side elevation of one form of device for performing the breaking-up operation on the treated web;

Fig. 10 is a sectional view, mostly in elevation, on line 10—10 of Fig. 9;

Fig. 11 is a plan view of a mold with a rope-like web coiled therein preparatory to heating and compressing the same to form the clutch friction disk;

Fig. 12 is a fragmental section on line 12—12 of Fig. 11, with the top or pressing-plate or ring shown in position prior to the pressing operation;

Fig. 13 is a view similar to Fig. 12 at the completion of the pressing operation;

Fig. 14 is a view similar to Fig. 11, with the mold omitted, but showing two separate coiled webs, each web having a friction coefficient substantially different from the other and shown schematically;

Fig. 15 is a plan or face view of a clutch friction disk made from the coiled web construction illustrated in Fig. 14 with the differential friction areas shown schematically;

Fig. 16 is a view similar to Fig. 14 of a larger number of separate coiled webs prior to the pressing operation, each web having a friction coefficient different from each other web and shown schematically;

Fig. 17 is a plan or face view of a clutch friction disk made in accordance with the construction illustrated in Fig. 16 with the differential friction areas shown schematically;

Fig. 18 is a diagrammatic cross-sectional view of two adjacent impregnated webs prior to the pressing operation;

Fig. 19 is a cross-sectional view illustrating the interlocking action between the two webs in final pressed-together condition; and Fig. 20 is a face view of a portion of a clutch friction disk having holes therethrough for use in mounting the disk on the plate.

In the description and claims, the various parts and steps are identified by specific names for convenience, but they are intended to be as generic in their application as the prior art will permit.

Referring to Figs. 1 to 13 and 18 to 20 inclusive, the clutch friction disk 30 may be formed of a coiled rope-like web 31 which has its exterior strands preferably loosely interlaced by weaving the same, as shown in Fig. 3. The particular web 31 illustrated in Fig. 3 has a plurality of straight or central strands 32 surrounded by a tubular outer woven portion formed of warp strands 33 and a continuous generally helical weft strand 34. The entire web 31 is preferably made of an open or loosely formed construction in order to have spaces between the various strands to permit ready penetration or impregnation with friction treatment or material. The tubular weave construction results in the formation of alternate interstices, pockets or depressions and projections or loops along the surface of the web, for a purpose to be later more fully described. The web 31 is preferably formed of asbestos strands which may be of the same size or different sizes and may contain a certain portion of cotton or other strengthening fiber and, preferably, the strands have wire cores 35 of brass or other suitable metal.

The web 31 is next impregnated with friction treatment, preferably of a type which will give a strong bonding action. One suitable bonding friction treatment that can be used is the following composition, in the form of a thick viscous mass, as viscous as heavy molasses or steam cylinder oil:

| | Per cent |
|---|---|
| Synthetic resin | 42.85 |
| Alcohol | 42.85 |
| Carbon black | 7.14 |
| Rubber dust | 7.14 |

Another suitable bonding friction treatment that can be used is the following composition:

| | Per cent |
|---|---|
| Rubber (milled) | 7.67 |
| Sulphur | 4.76 |
| Accelerators | 2.38 |
| Zinc dust | 11.51 |
| Carbon black | 1.44 |
| China clay | 11.51 |
| Gasoline | 33.83 |
| Barium sulphate (barytes) | 11.51 |
| Asbestos | 15.34 |

Whether either of these or some other desired treatment be used, the impregnated or treated web 31 is dried, preferably at about 180 degrees F. and driving off the alcohol or gasoline, whereupon the web will have the appearance of the treated unbroken web 36 shown in Fig. 4. The impregnated web 36 is stiff and unyielding. The web 36 is thereupon subjected to a breaking-up operation, which may consist of passing the web 36 through a series of pairs of rolls 37 (Figs. 9 and 10) to alternately bend the web 36 back and forth to break up the cementing action of the treatment on the strands and render the web flexible and as shown at 38 in Fig. 5.

The broken-up web 38 preferably has its ends cut on an angle or taper or bias, as at 39 (Fig. 11), and is coiled in a spiral in the annular channel 40 of the mold 41 (Figs. 11 and 12), whereupon a pressing-ring or plate 42 is placed upon the coils of the web and forced downward while the mold and pressing-plate are suitably heated, whereupon the friction treatment is rendered plastic and then hardens. After a suitable time, the pressed disk is removed from the mold and has its opposite faces ground to the desired thickness, whereupon the finished disk appears as illustrated in Fig. 1.

In the pressing operation, each two adjacent coil-sections or webs 43, 44 (Fig. 18) have adjacent depressions 45 and projections 46, which, when the pressing operation takes place, tend to become interfitted in one another to thereby interlock adjacent coil or web-sections together. Also, the treatment, where it is of the bonding type, whether of the Bakelite or rubber type, aids in firmly joining the web-sections together into a strong disk, and forms strong solid peg or key-elements, which key together interfitted adjacent projections or loop-portions of adjacent web-sections to greatly aid in producing a disk of maximum strength.

By having the web wider in its final compressed condition, radially of the disk, than the width of the holes 47 and 48 (Fig. 20) that are drilled or cut through the disk 30, in order to mount the disk on the plate, no web-section or coil will be completely severed by any hole, thus preventing the possibility of portions of the disk between the holes 47 and 48 becoming detached or falling out.

Instead of making a web by weaving, a braided web 49 may be formed, as illustrated in Fig. 6. In this construction, a plurality of straight or central strands 50 is provided with a covering of preferably loosely interlaced strands in the form of a tubular braided covering 51. The entire web is preferably loosely formed of an open construction to permit ready penetration of the friction treatment. The braided construction provides alternate interstices, pockets or depressions and projections or loops corresponding to those formed in the woven construction of Fig. 3. The braided web 49 will be impregnated with bonding friction treatment and broken up and coiled and molded by heat and pressure in a similar manner to that described for the woven web construction of Figs. 3, 4 and 5.

In the construction illustrated in Fig. 14, two distinct webs are used, each having a different bonding friction treatment. The web forming the inner coils 52 is impregnated with a bonding treatment of one friction coefficient, and the web forming the outer coils 53 is impregnated with a bonding treatment of a different friction coefficient. When subjected to heat and pressure, in a manner similar to that previously described concerning Figs. 11 to 13, a disk 54 (Fig. 15) is provided having an inner annular area 55 of one friction coefficient, and an outer annular area 56 of a different friction coefficient. This type of friction disk 54 is particularly adapted for use in clutches providing sequential engagement of the different friction areas of different friction coefficients in accordance with the disclosure of the patent of Channing E. Harwood, No. 2,135,126, granted November 1, 1938.

In the form of construction illustrated in Fig. 16, each of the coils 57, 58, 59, 60 and 61 is formed of a separate web, each web having a friction treatment of different friction coefficient from that of each of the other webs. When subjected to heat and pressure, a friction disk 62 (Fig. 17) is formed, the different annular areas 63, 64, 65, 66 and 67 each have a different friction coefficient, for use in clutches in accordance with the disclosure of the aforementioned Harwood patent.

By loosely forming the web, the latter is so readily penetrated and impregnated by friction treatments, even when the latter contain considerable solids, that it is possible to use friction treatments which aid in producing a clutch friction disk characterized by smooth-action non-chatter qualities substantially throughout the life of the disk. And when the web is formed in accordance with the present invention, it has great tensile strength, and when formed into a clutch friction disk as herein disclosed with the coils interlocked by the bonding friction treatment, it produces a disk having great resistance to destruction or breakage by centrifugal force.

Finished disks made in accordance with the present invention, when made with asbestos strand, whether wire cored or not, will ordinarily consist of about 70% to 40% strands with about 30% to 60% of treatment.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A clutch friction disk formed by compressing one or more preformed friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces.

2. A clutch friction disk formed by compressing one or more preformed friction-treatment-impregnated, coiled, loosely-formed rope-like webs each having exterior interlaced strands forming interstices and projections so that when the coils are compressed to form the disk, interstices and projections of coil surfaces are interfitted respectively with adjacent projections and interstices of adjacent coil surfaces.

3. A clutch friction disk formed by compressing one or more preformed bonding friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces.

4. A clutch friction disk formed by heating and compressing one or more preformed bonding friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces.

5. A clutch friction disk formed by heating and compressing one or more preformed bonding friction-treatment-impregnated, coiled, loosely-formed rope-like webs each having exterior interlaced strands forming interstices and projections so that when the coils are compressed to form the disk, interstices and projections of coil surfaces are interfitted respectively with adjacent projections and interstices of adjacent coil surfaces.

6. A clutch friction disk formed by compressing one or more preformed friction-treatment-impregnated, coiled, rope-like webs each having interior strands, and exterior interlaced strands forming interstices and projections so that when the coils are compressed to form the disk, interstices and projections of coil surfaces are interfitted respectively with adjacent projections and interstices of adjacent coil surfaces.

7. A clutch friction disk formed by compressing one or more preformed friction-treatment-impregnated, coiled, rope-like webs each having exterior woven strands forming interstices and projections so that when the coils are compressed to form the disk, interstices and projections of coil surfaces are interfitted respectively with adjacent projections and interstices of adjacent coil surfaces.

8. A clutch friction disk formed by compressing one or more preformed friction-treatment-impregnated, coiled, rope-like webs each having exterior braided strands forming interstices and projections so that when the coils are compressed to form the disk, interstices and projections of coil surfaces are interfitted respectively with adjacent projections and interstices of adjacent coil surfaces.

9. A clutch friction disk formed by compressing two or more friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces, certain of said webs having a friction-coefficient substantially different from that of other of said webs.

10. A clutch friction disk formed by compressing a plurality of preformed friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces, certain of said webs forming an annular area having a friction-coefficient substantially different from that of other of said webs forming a different annular area.

11. A clutch friction disk formed by compressing one or more preformed friction-treatment-impregnated, coiled, rope-like webs each having exterior interlaced strands forming interstices and projections so that when the coils are compressed to form the disk, interstices and projections of coil surfaces are interfitted respectively with adjacent projections and interstices of adjacent coil surfaces, said disk having holes cut therethrough, and the width radially of the disk of said coils in the compressed disk being greater than the width of said holes radially of the disk.

GUSTAV WALTERS.